US010623171B2

(12) United States Patent
Onaka et al.

(10) Patent No.: US 10,623,171 B2
(45) Date of Patent: Apr. 14, 2020

(54) TRANSMISSION AND RECEPTION MODULE FOR A PLURALITY OF FREQUENCY BANDS

(71) Applicant: Murata Manufacturing Co., Ltd., Kyoto (JP)

(72) Inventors: Kengo Onaka, Kyoto (JP); Hidenori Obiya, Kyoto (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 229 days.

(21) Appl. No.: 15/674,651

(22) Filed: Aug. 11, 2017

(65) Prior Publication Data
US 2017/0353287 A1    Dec. 7, 2017

Related U.S. Application Data

(63) Continuation of application No. PCT/JP2016/052546, filed on Jan. 28, 2016.

(30) Foreign Application Priority Data

Feb. 13, 2015   (JP) ................... 2015-026158

(51) Int. Cl.
*H04L 5/14*   (2006.01)
*H04B 1/00*   (2006.01)
(Continued)

(52) U.S. Cl.
CPC ........... *H04L 5/1461* (2013.01); *H04B 1/006* (2013.01); *H04B 1/0057* (2013.01);
(Continued)

(58) Field of Classification Search
CPC ...... H04B 1/006; H04B 1/0475; H04B 1/525; H04L 5/1461
See application file for complete search history.

(56) References Cited

U.S. PATENT DOCUMENTS

2011/0117862 A1    5/2011  Bagger et al.
2011/0215886 A1*   9/2011  Kawai ................... H01P 1/203
                                                                333/219
(Continued)

FOREIGN PATENT DOCUMENTS

JP    2014-140115 A    7/2014
WO    2012/140969 A1   10/2012

OTHER PUBLICATIONS

International Search report dated Mar. 8, 2016 in PCT/JP2016/052546.
Written Opinion dated Mar. 8, 2016 in PCT/JP2016/052546.

*Primary Examiner* — Hoon J Chung
(74) *Attorney, Agent, or Firm* — Pearne & Gordon LLP (57) ABSTRACT

Transmission paths correspond to frequency bands, respectively, and transmission signals of the four bands are transmitted through the transmission paths. Reception paths correspond to the frequency bands, respectively, and reception signals of the four bands are transmitted through the reception bands. A Tx switch selects a transmission path corresponding to one of the frequency bands so that a transmission signal corresponding to the frequency band is emitted from an antenna. An Rx switch selects a reception path corresponding to the frequency band so that a reception signal of the frequency band received by the antenna is extracted. A tunable filter is a filter whose frequency band is adjusted in a variable manner so that reception band noise of the frequency band is attenuated, and is provided between each of the antenna and the Rx switch, and the Tx switch.

10 Claims, 10 Drawing Sheets

(51) Int. Cl.
*H04B 1/525* (2015.01)
*H04B 1/04* (2006.01)
*H04B 1/48* (2006.01)

(52) U.S. Cl.
CPC .............. *H04B 1/0475* (2013.01); *H04B 1/48* (2013.01); *H04B 1/525* (2013.01); *H04L 5/1423* (2013.01)

(56) References Cited

U.S. PATENT DOCUMENTS

| | | | |
|---|---|---|---|
| 2013/0342285 A1* | 12/2013 | Kadota | H01G 7/06 333/188 |
| 2014/0038531 A1 | 2/2014 | Hayafuji et al. | |
| 2014/0203887 A1 | 7/2014 | Murata et al. | |
| 2014/0295775 A1* | 10/2014 | Rousu | H04B 1/006 455/73 |
| 2014/0307599 A1* | 10/2014 | Rousu | H04B 1/006 370/297 |

* cited by examiner

TRANSMISSION AND RECEPTION MODULE FOR A PLURALITY OF FREQUENCY BANDS

This is a continuation of International Application No. PCT/JP2016/052546 filed on Jan. 28, 2016 which claims priority to Japanese Patent Application No. 2015-026158 filed on Feb. 13, 2015. The contents of these applications are incorporated herein by reference in their entireties.

BACKGROUND

Technical Field

The present disclosure relates to a transmission and reception module, and more particularly, to a transmission and reception module that is applied to a mobile communication terminal and performs transmission and reception using a plurality of frequency bands.

An example of a transmission and reception module of this type is disclosed in Patent Document 1. According to Patent Document 1, a diplexer includes a low pass filter and a high pass filter and is connected to an antenna. A plurality of duplexers corresponding to a plurality of lower frequency bands are connected to the low pass filter of the diplexer with a lower-frequency-side switch interposed therebetween. A plurality of duplexers corresponding to a plurality of higher frequency bands are connected to the high pass filter of the diplexer with a higher-frequency-side switch interposed therebetween.

For communication using any of the lower frequency bands, a duplexer corresponding to the frequency band is selected by the lower-frequency-side switch. In a similar manner, for communication using any of the higher frequency bands, a duplexer corresponding to the frequency band is selected by the higher-frequency-side switch.

Patent Document 1: Japanese Unexamined Patent Application Publication No. 2014-140115

BRIEF SUMMARY

According to specifications of 3GPP (Third Generation Partnership Project), many of frequency bands conforming to an FDD (Frequency Division Duplex) system are distributed over a range from 700 MHz band to 2100 MHz band. The above frequency bands include wide gap band with a wide gap between a transmission band and a reception band and a narrow gap band with a narrow gap between a transmission band and a reception band. For example, for frequency band 1, the gap between the transmission band and the reception band is wide, such as 130 MHz, and for frequency band 8, the gap between the transmission band and the reception band is narrow, such as 10 MHz.

Furthermore, as described in Patent Document 1, a transmission signal of a frequency band selected for transmission and reception from among a plurality of frequency bands is amplified by a power amplifier.

However, if the selected frequency band is a narrow band, noise generated in the transmission band of the frequency band leaks into the reception band of the frequency band. The noise which has leaked into the reception band, that is, reception band noise, is amplified by the power amplifier, along with the noise generated in the transmission band. Therefore, in the case where the isolation characteristics of a duplexer are not sufficient, in the narrow band, the reception band noise which has been amplified by the power amplifier comes to the reception side from the transmission side, and therefore, the signal to noise ratio of a reception signal is easily degraded.

Moreover, it is impossible to determine in advance a frequency band to be selected for transmission and reception. Therefore, to reduce the concern about degradation of the signal to noise ratio of a reception signal, it is necessary to take countermeasures against the degradation for each of the plurality of frequency bands.

In the case where the power added efficiency of a power amplifier which amplifies a transmission signal of a frequency band is optimized by envelope tracking, noise in a frequency band corresponding to the reception band of the frequency band is generated from a DC-DC converter by a tracking operation. The reception band noise generated as described above is also amplified by a power amplifier. Therefore, the signal to noise ratio of the reception signal is further easily degraded when envelop tracking is performed.

Hence, the present disclosure provides a transmission and reception module which is capable of reducing the concern about degradation of the signal to noise ratio of a reception signal by reception band noise coming to a reception side from a transmission side in any of a plurality of frequency bands used.

A transmission and reception module according to the present disclosure includes a plurality of first transmission paths that correspond to frequency bands of first frequency bands including different frequency bands, a plurality of first transmission signals being transmitted through the plurality of first transmission paths to an antenna; a plurality of first reception paths that correspond to frequency bands of the first frequency bands, a plurality of first reception signals received from the antenna being transmitted through the plurality of first reception paths; a first transmission switch that selects a first transmission path to be electrically connected from among the plurality of first transmission paths; a first reception switch that selects a first reception path to be electrically connected from among the plurality of first reception paths; and a transmission variable filter that is provided between the antenna and the first transmission switch. The transmission variable filter varies a frequency band to attenuate reception band noise in the plurality of first frequency bands.

The transmission and reception module can further include a reception variable filter that is provided between the antenna and the first reception switch and attenuates transmission band noise in the plurality of first frequency bands.

The transmission and reception module can further include a diplexer that includes a first filter element through which the first frequency bands pass and a second filter element through which second frequency bands including different frequency bands pass and is connected to the antenna; and a harmonic variable filter that is provided between the diplexer and the first transmission switch and varies a frequency band to attenuate harmonic in individual frequency bands of the first frequency bands.

The transmission and reception module can further include a plurality of second transmission paths that correspond to frequency bands of the second frequency bands, a plurality of second transmission signals being transmitted through the plurality of second transmission paths to the antenna; a plurality of second reception paths that correspond to frequency bands of the second frequency bands, a plurality of second reception signals being transmitted through the plurality of second reception paths; a second transmission switch that selects a second transmission path to be electrically connected from among the plurality of second transmission paths; and a second reception switch that selects a second reception path to be electrically connected from among the plurality of second reception paths.

The transmission variable filter can include a variable capacitor that is adjusted to a capacitance corresponding to the first frequency bands, one terminal of the variable capacitor being connected to a transmission line, a piezoelectric resonator that is provided between the other terminal of the variable capacitor and a reference potential plane, and an inductor that is connected in parallel with the piezoelectric resonator.

The transmission and reception module can further include a filter switch that turns on/off the transmission variable filter.

The transmission and reception module can further include a plurality of power amplifiers that are provided at the plurality of first transmission paths and amplify the plurality of first transmission signals.

A communication apparatus according to the present disclosure includes the above transmission and reception module; and a harmonic integrated circuit that is connected to the transmission and reception module. The communication apparatus can further include a baseband integrated circuit that is connected to the harmonic integrated circuit.

Reception band noise which is generated when a first transmission signal of a first frequency band is output comes to a reception path which is selected by a reception switch. However, the reception band noise is attenuated by a transmission variable filter. Consequently, concern about degradation of the signal to noise ratio of a reception signal caused by reception band noise coming to the reception side from the transmission side may be reduced.

The features and advantages of the present disclosure will become more apparent from the following detailed description of embodiments of the present disclosure with reference to the attached drawings.

DETAILED DESCRIPTION

Figure 1:
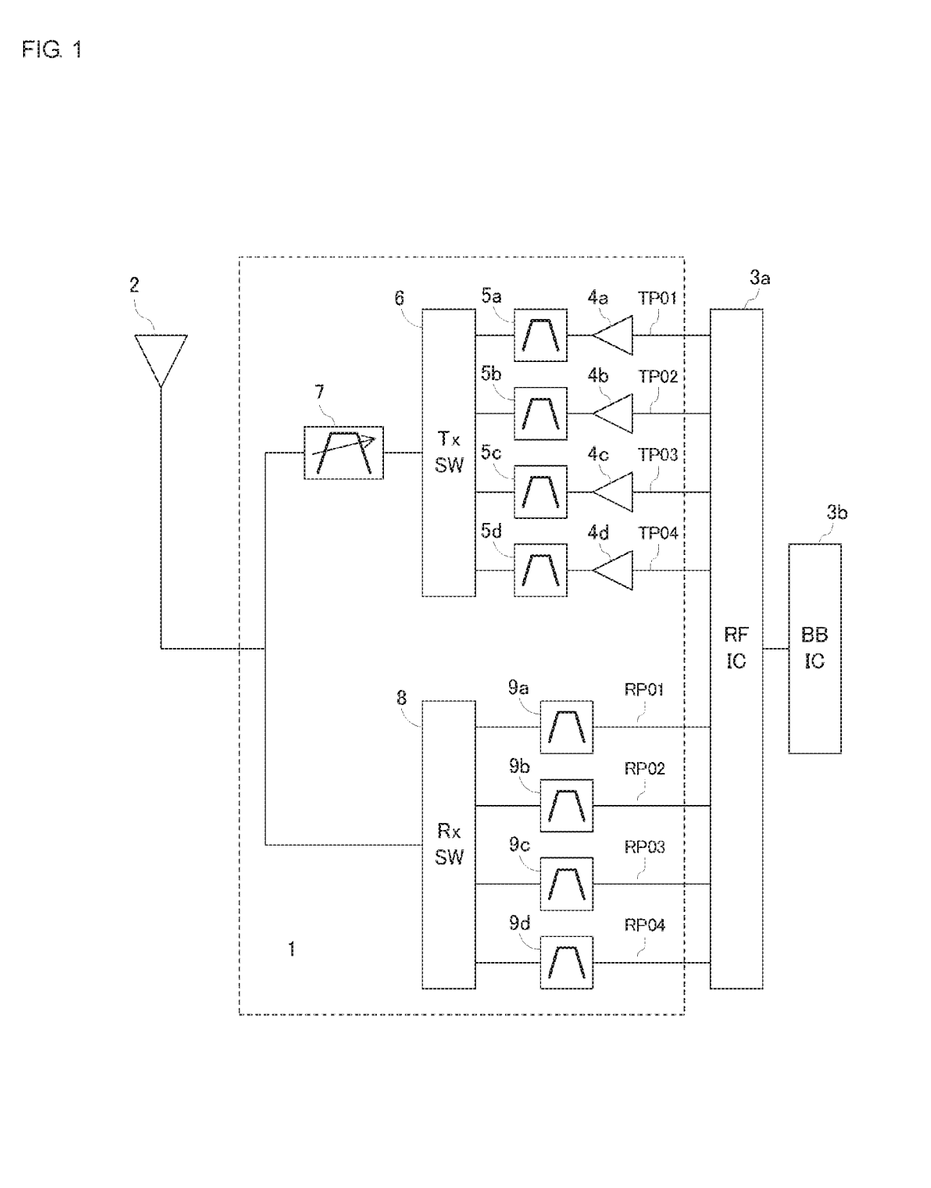
FIG. 1 is a block diagram illustrating a configuration of a communication apparatus according to an embodiment.

Referring to FIG. 1, a communication apparatus according to an embodiment includes a transmission and reception module 1 which is provided between an antenna 2 and an RFIC (Radio Frequency Integrated Circuit) 3a. Transmission paths TP01 to TP04 correspond to four frequency bands FB01 to FB04, and reception paths RP01 to RP04 correspond to the four frequency bands FB01 to FB04.

The RFIC 3a modulates the fundamental frequency of a transmission signal output from a BBIC (Base Band Integrated Circuit) 3b into any one of the frequency bands FB01 to FB04, and demodulates the frequency of a reception signal transmitted through any one of the reception paths RP01 to RP04 into the fundamental frequency.

A transmission signal of the frequency band FB01 is transmitted through the transmission path TP01, and a transmission signal of the frequency band FB02 is transmitted through the transmission path TP02. A transmission signal of the frequency band FB03 is transmitted through the transmission path TP03, and a transmission signal of the frequency and FB04 is transmitted through the transmission path TP04. For any transmission signal, the transmission direction is a direction from the RFIC 3 toward the antenna 2.

Specifically, a transmission signal of the frequency band FB01 is amplified by a power amplifier 4a, and passes through a BPF 5a whose pass band is set to a transmission band of the frequency band FB01. A transmission signal of the frequency band FB02 is amplified by a power amplifier 4b, and passes through a BPF 5b whose pass band is set to a transmission band of the frequency band FB02.

A transmission signal of the frequency band FB03 is amplified by a power amplifier 4c, and passes through a BPF 5c whose pass band is set to a transmission band of the frequency band FB03. A transmission signal of the frequency band FB04 is amplified by a power amplifier 4d, and passes through a BPF 5d whose pass band is set to a transmission band of the frequency band FB04.

A reception signal of the frequency band FB01 is transmitted through the reception path RP01 at which a BPF 9a is provided, and a reception signal of the frequency band FB02 is transmitted through the reception path RP02 at which a BPF 9b is provided. A reception signal of the frequency band FB03 is transmitted through the reception path RP03 at which a BPF 9c is provided, and a reception signal of the frequency band FB04 is transmitted through the reception path RP04 at which a BPF 9d is provided.

The BPF 9a uses a reception band of the frequency band FB01 as a pass band, and the BPF 9b uses a reception band of the frequency band FB02 as a pass band. The BPF 9c uses a reception band of the frequency band FB03 as a pass band, and the BPF 9d uses a reception band of the frequency band FB04 as a pass band. Furthermore, for any reception signal, the transmission direction is a direction from the antenna 2 toward the RFIC 3.

A Tx switch (transmission switch) 6 selects a transmission path corresponding to a frequency band for transmission and reception, that is, a desired frequency band, from among the transmission paths TP01 to TP04. An Rx switch (reception switch) 8 selects a reception path corresponding to a desired frequency band from among the reception paths RP01 to RP04.

A tunable filter (transmission variable filter) 7 whose frequency band is varied so that a reception band of a desired frequency band (any one of the frequency bands FB01 to FB04) is defined as a stop band, is provided between each of the antenna 2 and the Rx switch 8, and the Tx switch 6. The tunable filter 7 is adjusted, in accordance with a desired frequency band, to exhibit characteristics in that a transmission band signal of the frequency band passes through the tunable filter 7 and a reception band signal of the frequency band is attenuated. Accordingly, reception band noise which is generated in a reception band of a desired frequency band and amplified by a corresponding power amplifier is attenuated by the tunable filter 7.

With this configuration, a transmission signal of a desired frequency band which is output from the RFIC 3 passes through a transmission path corresponding to the desired frequency band, the Tx switch 6, and the tunable filter 7, and is emitted from the antenna 2. A reception signal of the desired frequency band which is received at the antenna 2 passes through the Rx switch 8 and a reception path corresponding to the desired frequency band, and is supplied to the RFIC 3.

The reception band noise amplified by the power amplifier corresponding to the desired frequency band is attenuated by the tunable filter 7. As a result, concern about degradation of the signal to noise ratio of a reception signal caused by reception band noise coming to the reception side from the transmission side may be reduced.

Figure 2A:
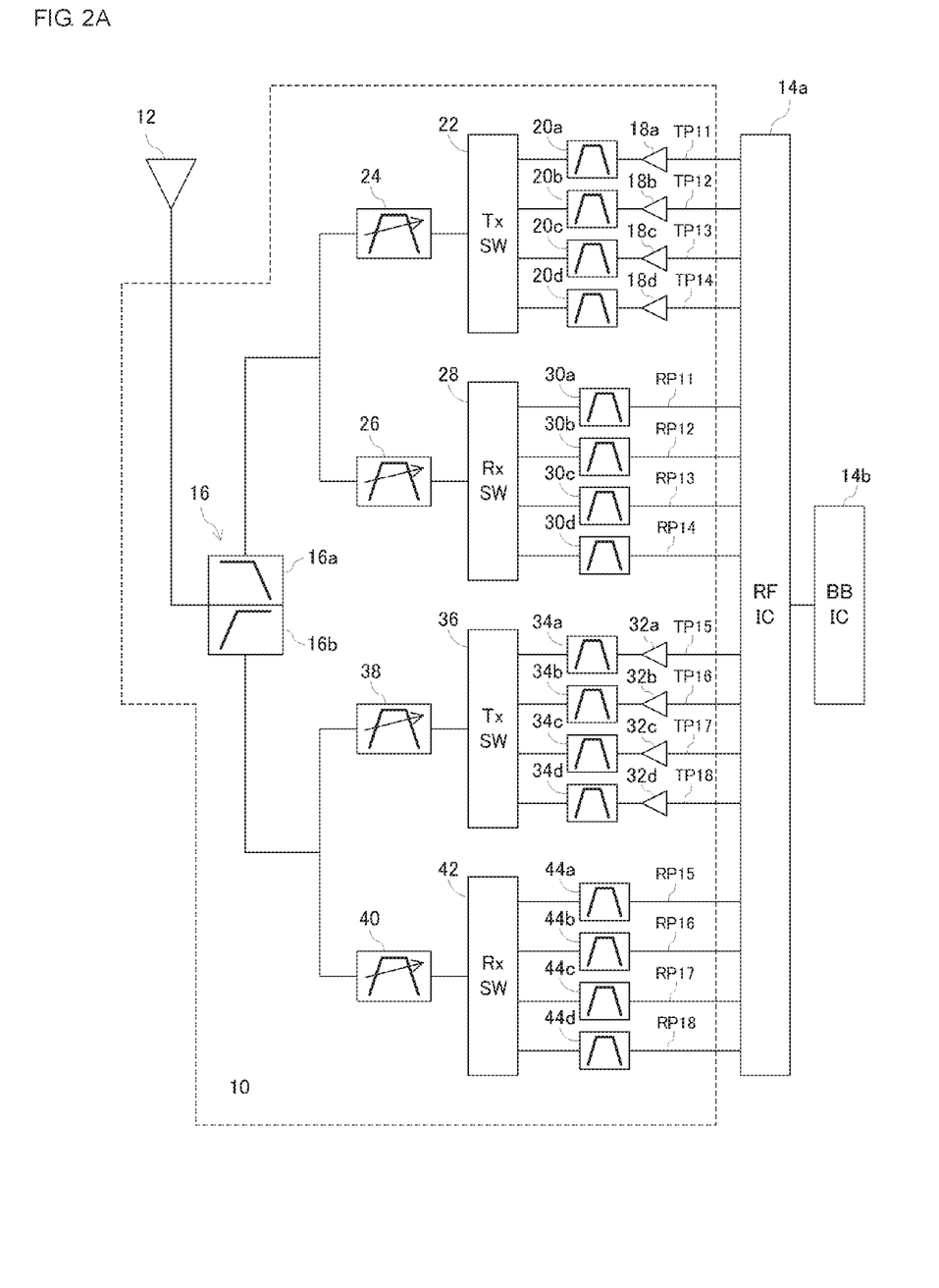
FIG. 2A is a block diagram illustrating a configuration of a communication apparatus according to another embodiment.

Referring to FIG. 2A, a communication apparatus according to another embodiment is applied to a mobile communication terminal which conforms to LTE (Long Term Evolution) standards, and supports transmission and reception in a carrier aggregation system. More specifically, a transmission and reception module 10 is provided between an antenna 12 and an RFIC 14a. A BBIC 14b outputs a transmission signal which has not been modulated by the RFIC 14a, and receives a reception signal which has been demodulated by the RFIC 14a.

According to the specifications of 3GPP, twenty or more bands corresponding to the FDD system are distributed over a range from 700 MHz band to 2100 MHz band. Unless otherwise particularly stated, this embodiment will be described on the assumption that frequency bands (first frequency bands; low bands) FB11 to FB14 are allocated to bands equal to or lower than 900 MHz band and frequency bands (second frequency bands; high bands) FB15 to FB18 are allocated to bands equal to or higher than 1500 MHz band.

A diplexer 16 includes an LPF (first filter element) 16a through which a frequency signal of 900 MHz band or lower passes and an HPF (second filter element) 16b through which a frequency signal of 1400 MHz or higher passes. One terminal of the LPF 16a and the HPF 16b are connected in common to the antenna 12.

The other terminal of the LPF 16a is connected to a common terminal of a Tx switch (first transmission switch) 22 with a tunable filter (transmission variable filter) 24 interposed therebetween, and is connected to a common terminal of an Rx switch (first reception switch) 28 with a tunable filter 26 interposed therebetween. Furthermore, the other terminal of the HPF 16b is connected to a common terminal of a Tx switch (second transmission switch) 36 with a tunable filter 38 interposed therebetween, and is connected to a common terminal of an Rx switch (second reception switch) 42 with a tunable filter 40 interposed therebetween.

Each of the Tx switch 22, the Rx switch 28, the Tx switch 36, and the Rx switch 42 includes four individual terminals. The four individual terminals of the Tx switch 22 are connected to transmission paths (first transmission paths) TP11 to TP14, and the four individual terminals of the Rx switch 28 are connected to reception paths (first reception paths) RP11 to RP14. Furthermore, the four individual terminals of the Tx switch 36 are connected to transmission paths (second transmission paths) TP15 to TP18, and the four individual terminals of the Rx switch 42 are connected to reception paths (second reception paths) RP15 to RP18.

At the transmission path TP11, a power amplifier 18a and a BPF 20a are arranged in the direction from the RFIC 14a toward the Tx switch 22, and at the transmission path TP12, a power amplifier 18b and a BPF 20b are arranged in the direction from the RFIC 14a toward the Tx switch 22. At the transmission path TP13, a power amplifier 18c and a BPF 20c are arranged in the direction from the RFIC 14a toward the Tx switch 22, and at the transmission path TP14, a power amplifier 18d and a BPF 20d are arranged in the direction from the RFIC 14a toward the Tx switch 22.

At the transmission path TP15, a power amplifier 32a and a BPF 34a are arranged in the direction from the RFIC 14a toward the Tx switch 36, and at the transmission path TP16, a power amplifier 32b and a BPF 34b are arranged in the direction from the RFIC 14a toward the Tx switch 36. At the transmission path TP17, a power amplifier 32c and a BPF 34c are arranged in the direction from the RFIC 14a toward the Tx switch 36, and at the transmission path TP18, a power amplifier 32d and a BPF 34d are arranged in the direction from the RFIC 14a toward the Tx switch 36.

BPFs 30a to 30d are provided at the reception paths RP11 to RP14, respectively, and BPFs 44a to 44d are provided at the reception paths RP15 to RP18, respectively.

The power added efficiency of each of the power amplifiers 18a to 18d and 32a to 32d may be optimized by an envelope tracking method. Furthermore, piezoelectric filters such as SAW filters or BAW filters are adopted as the BPFs 20a to 20d, 30a to 30d, 34a to 34d, and 44a to 44d.

The band pass of the BPF 20a is adjusted to the transmission band of the frequency band FB11, the pass band of the BPF 20b is adjusted to the transmission band of the frequency band FB12, the pass band of the BPF 20c is adjusted to the transmission band of the frequency band FB13, and the pass band of the BPF 20d is adjusted to the transmission band of the frequency band FB14. Furthermore, the pass band of the BPF 30a is adjusted to the reception band of the frequency band FB11, the pass band of the BPF 30b is adjusted to the reception band of the frequency band FB12, the pass band of the BPF 30c is adjusted to the reception band of the frequency band FB13, and the pass band of the BPF 30d is adjusted to the reception band of the frequency band FB14.

In a similar manner, the pass band of the BPF 34a is adjusted to the transmission band of the frequency band FB15, the pass band of the BPF 34b is adjusted to the transmission band of the frequency band FB16, the pass band of the BPF 34c is adjusted to the transmission band of the frequency band FB17, and the pass band of the BPF 34d is adjusted to the transmission band of the frequency band FB18. Furthermore, the pass band of the BPF 44a is adjusted to the reception band of the frequency band FB15, the pass band of the BPF 44*b* is adjusted to the reception band of the frequency band FB16, the pass band of the BPF 44*c* is adjusted to the reception band of the frequency band FB17, and the pass band of the BPF 44*d* is adjusted to the reception band of the frequency band FB18.

Accordingly, transmission signals of the frequency bands FB11 to FB18 (frequency signals belonging to the transmission bands of the corresponding frequency bands) are transmitted through the transmission paths TP11 to TP18, respectively. Furthermore, reception signals of the frequency bands FB11 to FB18 (frequency signals belonging to the reception bands of the corresponding frequency bands) are transmitted through the reception paths RP11 to RP18, respectively.

A frequency band which is used for transmission and reception from among the frequency bands FB11 to FB14 is defined as a "desired first frequency band", and a frequency band which is used for transmission and reception from among the frequency bands FB15 to FB18 is defined as a "desired second frequency band". In this case, each of the Tx switch 22 and the Rx switch 28 selects a BPF corresponding to the desired first frequency band, and each of the Tx switch 36 and the Rx switch 42 selects a BPF corresponding to the desired second frequency band.

The characteristics of the tunable filter 24 are adjusted such that a transmission signal of the desired first frequency band passes through the tunable filter 24 and a frequency signal in the reception band of the desired first frequency band is attenuated. Furthermore, the characteristics of the tunable filer 26 are adjusted such that a reception signal of the desired first frequency band passes through the tunable filter 26 and a frequency signal in the transmission band of the desired first frequency band is attenuated. In a similar manner, the characteristics of the tunable filter 38 are adjusted such that a transmission signal of the desired second frequency band passes through the tunable filter 38 and a frequency signal in the reception band of the desired second frequency band is attenuated. Furthermore, the characteristics of the tunable filter 40 are adjusted such that a reception signal of the desired second frequency band passes through the tunable filter 40 and a frequency signal in the transmission band of the desired second frequency band is attenuated.

The RFIC 14*a* inputs a transmission signal of a desired first frequency band (a frequency signal belonging to the transmission band of the desired first frequency band) to a power amplifier corresponding to the desired first frequency band among the power amplifiers 18*a* to 18*d*, and inputs a transmission signal of a desired second frequency band (frequency signal belonging to the transmission band of the desired second frequency band) to a power amplifier corresponding to the desired second frequency band among the power amplifiers 32*a* to 32*d*.

The transmission signal of the desired first frequency band is amplified by the power amplifier to which the transmission signal has been input, passes through a BPF corresponding to the desired first frequency band, the Tx switch 22, the tunable filter 24, and the diplexer 16, and is emitted from the antenna 12. In a similar manner, the transmission signal of the desired second frequency band is amplified by the power amplifier to which the transmission signal has been input, passes through a BPF corresponding to the desired second frequency band, the Tx switch 36, the tunable filter 38, and the diplexer 16, and is emitted from the antenna 12.

The reception signal of the desired first frequency band captured by the antenna 12 (frequency signal belonging to the reception band of the desired first frequency band) passes through the diplexer 16, the tunable filter 26, and the Rx switch 28, passes through a BPF corresponding to the desired first frequency band among the BPFs 30*a* to 30*d*, and is input to the RFIC 14*a*.

Furthermore, the reception signal of the desired second frequency band captured by the antenna 12 (frequency signal belonging to the reception band of the desired second frequency band) passes through the diplexer 16, the tunable filter 40, and the Rx switch 42, passes through a BPF corresponding to the desired second frequency band among the BPFs 44*a* to 44*d*, and is input to the RFIC 14*a*.

Figure 2B:
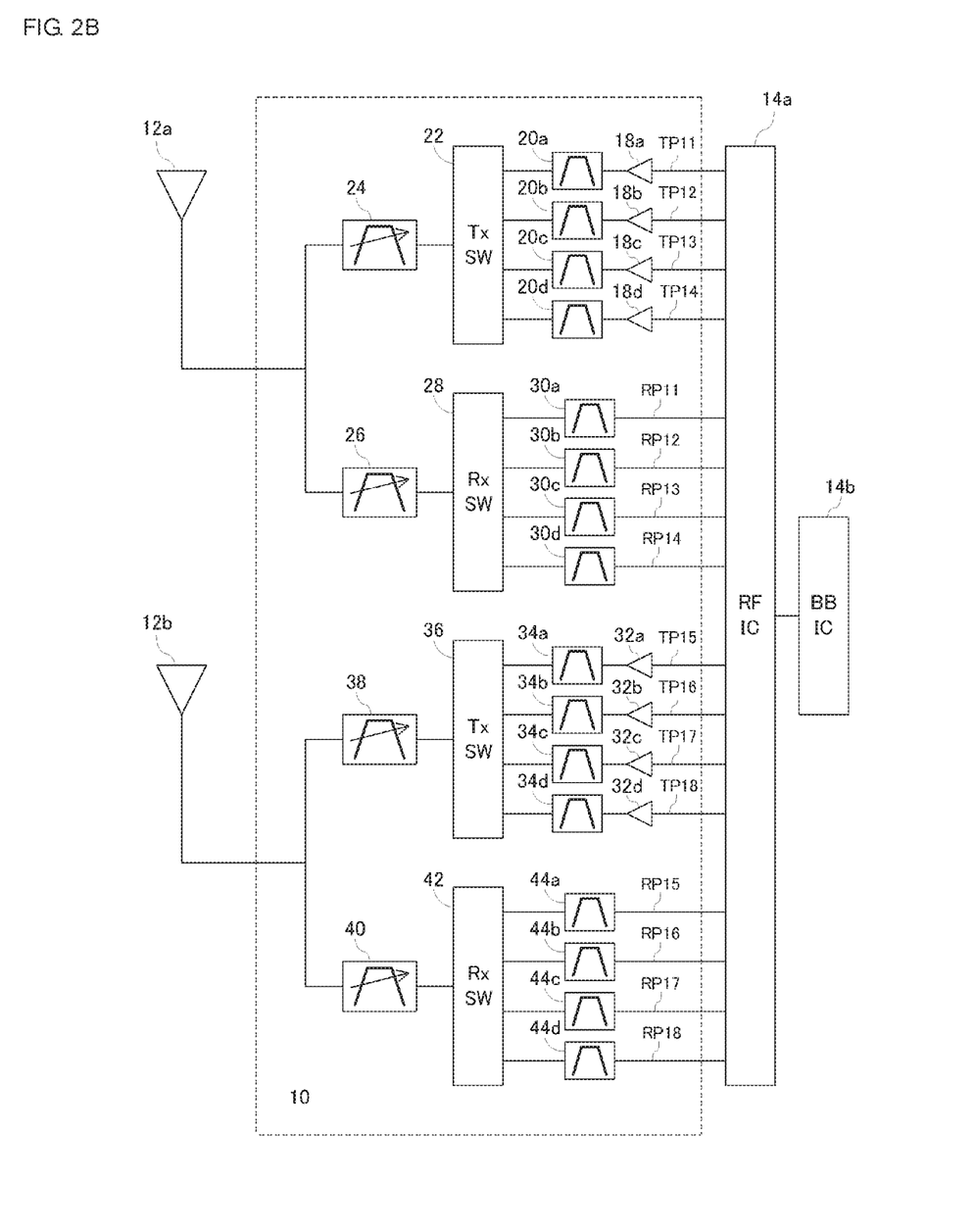
FIG. 2B is a block diagram illustrating a configuration of a communication apparatus according to another embodiment.

As illustrated in FIG. 2B, in the case where a first antenna 12*a* for the first frequency band and a second antenna 12*b* for the second frequency band are provided instead of the antenna 12, the diplexer 16 is not necessary. In this case, the first antenna 12*a* is directly connected to each of the tunable filters 24 and 26, and the second antenna 12*b* is directly connected to each of the tunable filters 38 and 40.

Figure 3:
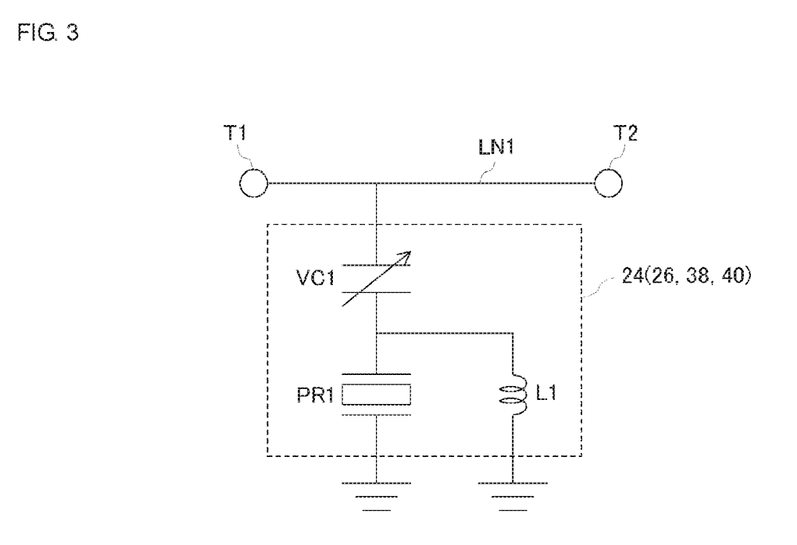
FIG. 3 is a circuit diagram illustrating an example of a configuration of a tunable filter which is applied to the communication apparatus illustrated in FIG. 2A or FIG. 2B.

All of the tunable filters 24, 26, 38, and 40 are notch filters, and specifically, are configured as illustrated in FIG. 3. Referring to FIG. 3, one terminal of a variable capacitor VC1 is connected to a signal line LN1, and the other terminal of the variable capacitor VC1 is connected to a reference potential plane with a piezoelectric resonator PR1 interposed therebetween. An inductor L1 is connected in parallel with the piezoelectric resonator PR1.

The frequency characteristics of each of the tunable filters 24, 26, 38, and 40 configured as described above are illustrated in FIG. 4. As is clear from FIG. 4, insertion loss drastically increases in one direction in the vicinity of an attenuation pole, that is, in a stop band. As a result, a signal of a frequency component belonging to the stop band among frequency signals transmitted through the signal line LN1 passes through the tunable filter 24, 26, 38, or 40 and flows into the reference potential plane.

Figure 4:
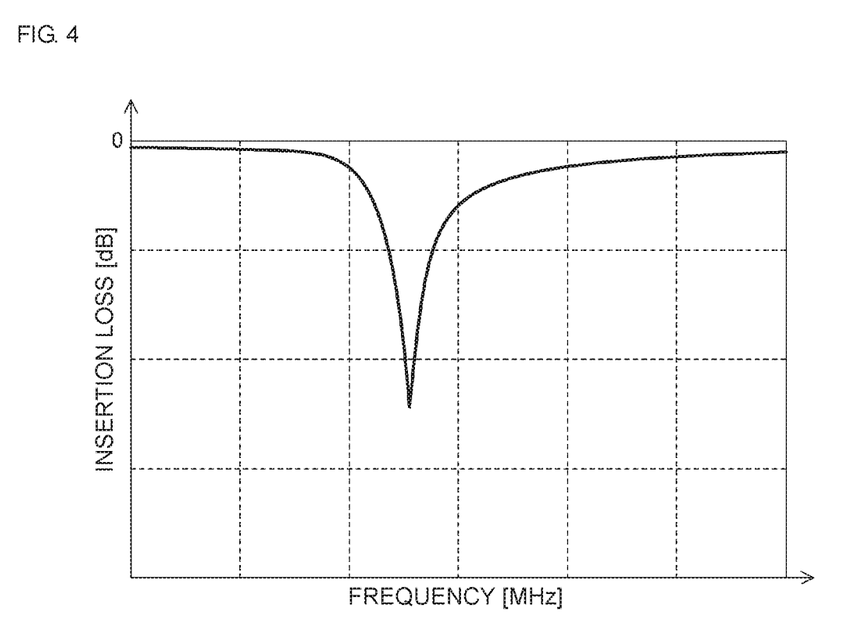
FIG. 4 is a graph illustrating an example of frequency characteristics of the tunable filter illustrated in FIG. 3.

The frequency of the stop band depends on the capacitance of the variable capacitor VC1. For the tunable filter 24, the stop band is adjusted to the reception band of a desired first frequency band, and for the tunable filter 26, the stop band is adjusted to the transmission band of a desired first frequency band. Furthermore, for the tunable filter 38, the stop band is adjusted to the reception band of a desired second frequency band, and for the tunable filter 40, the stop band is adjusted to the transmission band of a desired second frequency band.

In this embodiment, the frequency of the attenuation pole of the tunable filter 24 is adjusted to the center frequency of the reception band of the desired first frequency band, and the frequency of the attenuation pole of the tunable filter 26 is adjusted to the center frequency of the transmission band of the desired first frequency band. Furthermore, the frequency of the attenuation pole of the tunable filter 38 is adjusted to the center frequency of the reception band of the desired second frequency band, and the frequency of the attenuation pole of the tunable filter 40 is adjusted to the center frequency of the transmission band of the desired second frequency band.

A terminal T1 of the tunable filter 24 or 26 is connected to the LPF 16*a* of the diplexer 16, and the terminal T1 of the tunable filter 38 or 40 is connected to the HPF 16*b* of the diplexer 16. Furthermore, a terminal T2 of the tunable filter 24 is connected to the Tx switch 22, and the terminal T2 of the tunable filter 26 is connected to the Rx switch 28. Furthermore, the terminal T2 of the tunable filter 38 is connected to the Tx switch 36, and the terminal T2 of the tunable filter 40 is connected to the Rx switch 42.

According to the specifications of 3GPP, frequency bands corresponding to the FDD system include wide-gap bands with a wide gap between a transmission band and a reception band and narrow-gap bands with a narrow gap between a transmission band and a reception band. For example, the gap between the transmission band and the reception band of frequency band 1 is wide, such as 130 MHz, whereas the gap between the transmission band and the reception band of frequency band 8 is narrow, such as 10 MHz.

Therefore, if a desired first frequency band is a narrow gap band, even noise leaking into the reception band of the frequency band, that is, reception band noise, is amplified by a power amplifier corresponding to the desired first frequency band. In a similar manner, if a desired second frequency band is a narrow gap band, even noise leaking into the reception band of the frequency band, that is, reception band noise, is amplified by a power amplifier corresponding to the desired second frequency band.

Furthermore, the power added efficiency of a power amplifier is optimized by envelop tracking, and therefore, noise of a frequency band corresponding to the reception band of each of the desired first frequency band and the desired second frequency band is generated from a DC-DC converter by a tracking operation. The reception band noise generated as described above is also amplified by the power amplifier corresponding to the desired first frequency band and the power amplifier corresponding to the desired second frequency band.

When such reception band noise comes to the reception side from the transmission side, the signal to noise ratio of a reception signal degrades. Thus, in this embodiment, the stop band of the tunable filter 24 is adjusted to the reception band of the desired first frequency band, and the stop band of the tunable filter 38 is adjusted to the reception band of the desired second frequency band.

The reception band noise of the desired first frequency band is attenuated by the tunable filter 24, and the reception band noise of the desired second frequency band is attenuated by the tunable filter 38. As a result, the concern about degradation of the signal to noise ratio of the reception signal caused by the reception band noise coming to the reception side from the transmission side may be reduced.

Furthermore, in this embodiment, the stop band of the tunable filter 26 is adjusted to the transmission band of the desired first frequency band, and the stop band of the tunable filter 40 is adjusted to the transmission band of the desired second frequency band. A frequency signal of the transmission band which affects the reception band of the desired first frequency band is attenuated by the tunable filter 26, and a frequency signal of the transmission band which affects the reception band of the desired second frequency band is attenuated by the tunable filter 40. As a result, the signal to noise ratio of the reception signal is further improved.

Furthermore, in this embodiment, the tunable filters 24 and 26 are provided in the previous stage of the Tx switch 22 and the Rx switch 28, respectively, and the tunable filters 38 and 40 are provided in the previous stage of the Tx switch 36 and the Rx switch 42, respectively. However, as described above, the tunable filters 26 and 40 are provided only in an auxiliary manner. Therefore, the tunable filters 26 and 40 may be omitted.

Furthermore, referring to FIG. 3, all of the tunable filters 24, 26, 38, and 40 are connected to the signal line LN1 in a fixed manner. However, as described above, frequency bands corresponding to the FDD system include narrow gap bands with a narrow gap between a transmission band and a reception band and wide gap bands with a wide gap between a transmission band and a reception band, and the degree of probability that noise leaks into the reception band or the degree of leakage varies according to the frequency band. Furthermore, the tunable filters 24, 26, 38, and 40 cause transmission loss (insertion loss) to some extent. Therefore, connecting the tunable filters 24, 26, 38, and 40 to the signal LN1 in a fixed manner may degrade the transmission and reception performance depending on the frequency band.

Figure 5:
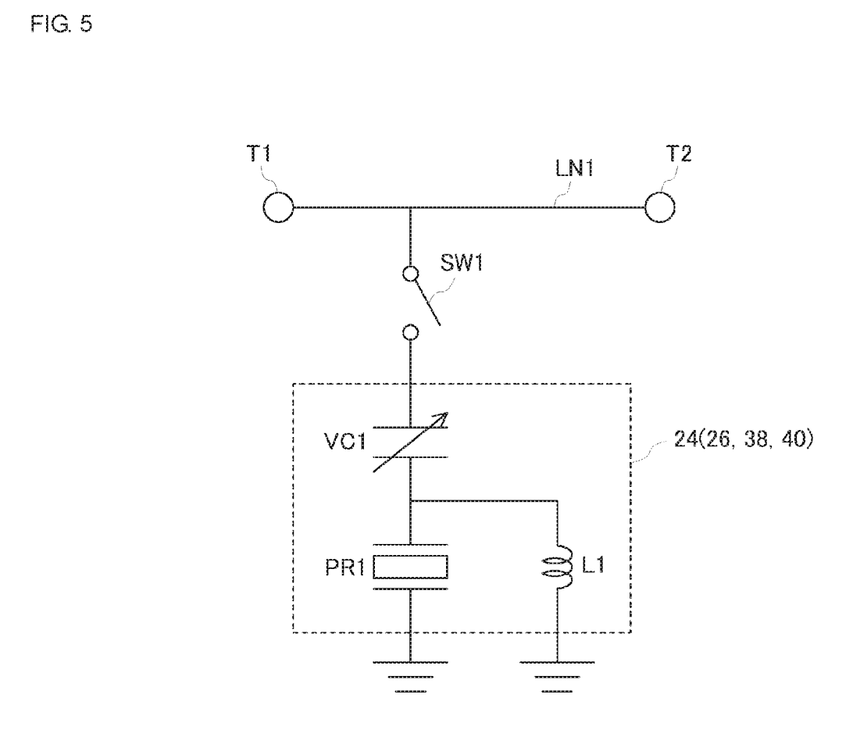
FIG. 5 is a circuit diagram illustrating an example of a configuration in which a switch is provided between a tunable filter and a signal line.

Such a concern may be eliminated by adding a switch (filter switch) SW1 between the signal LN1 and the tunable filter 24, 26, 38, or 40, as described in FIG. 5, and turning on/off the switch SW1 according to the frequency band.

Figure 6:
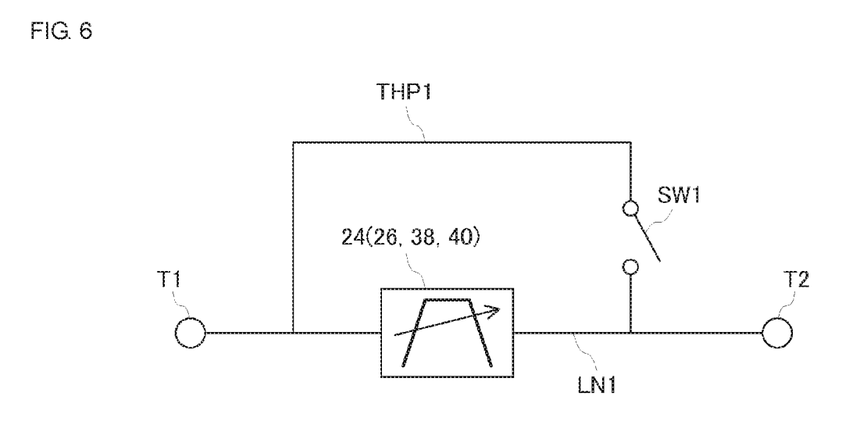
FIG. 6 is a block diagram illustrating an example of a configuration in which a signal line and a switch for bypassing a tunable filter.

In the case where the tunable filters 24, 26, 38, and 40 are connected in series with the signal line LN1, a signal line LN2 for bypassing the tunable filters 24, 26, 38, and 40 may be added and the switch SW1 may be provided at the signal line LN2, as illustrated in FIG. 6.

In the case where the transmission and reception module 10 performs transmission and reception in a carrier aggregation method, at least one of the frequency bands FB11 to FB14 and at least one of the frequency bands FB14 to FB18 may be used at the same time for transmission and reception.

In the carrier aggregation method, noise amplified by the power amplifiers 18a to 18d contains harmonic of a transmission signal of a desired first frequency band. The harmonic and a reception band allocated to a desired second frequency band may overlap.

For example, in the case where frequency band 8 and frequency band 3 defined in the specifications of 3GPP are specified as a desired first frequency band and a desired second frequency band, respectively, the transmission band of the frequency band 8 is 880 MHz to 915 MHz, and the reception band of the frequency band 3 is 1805 MHz to 1880 MHz. Therefore, second harmonic of a transmission signal of the frequency band 8 and the reception band of the frequency band 3 overlap.

In a similar manner, the transmission band of frequency band 12 is 699 MHz to 716 MHz, and the reception band of frequency band 4 is 2110 MHz to 2155 MHz. Therefore, when the frequency band 12 is specified as a desired first frequency band and the frequency band 4 is specified as a desired second frequency band, third harmonic of a transmission signal of the frequency band 12 and the reception band of the frequency band 4 overlap.

Figure 7A:
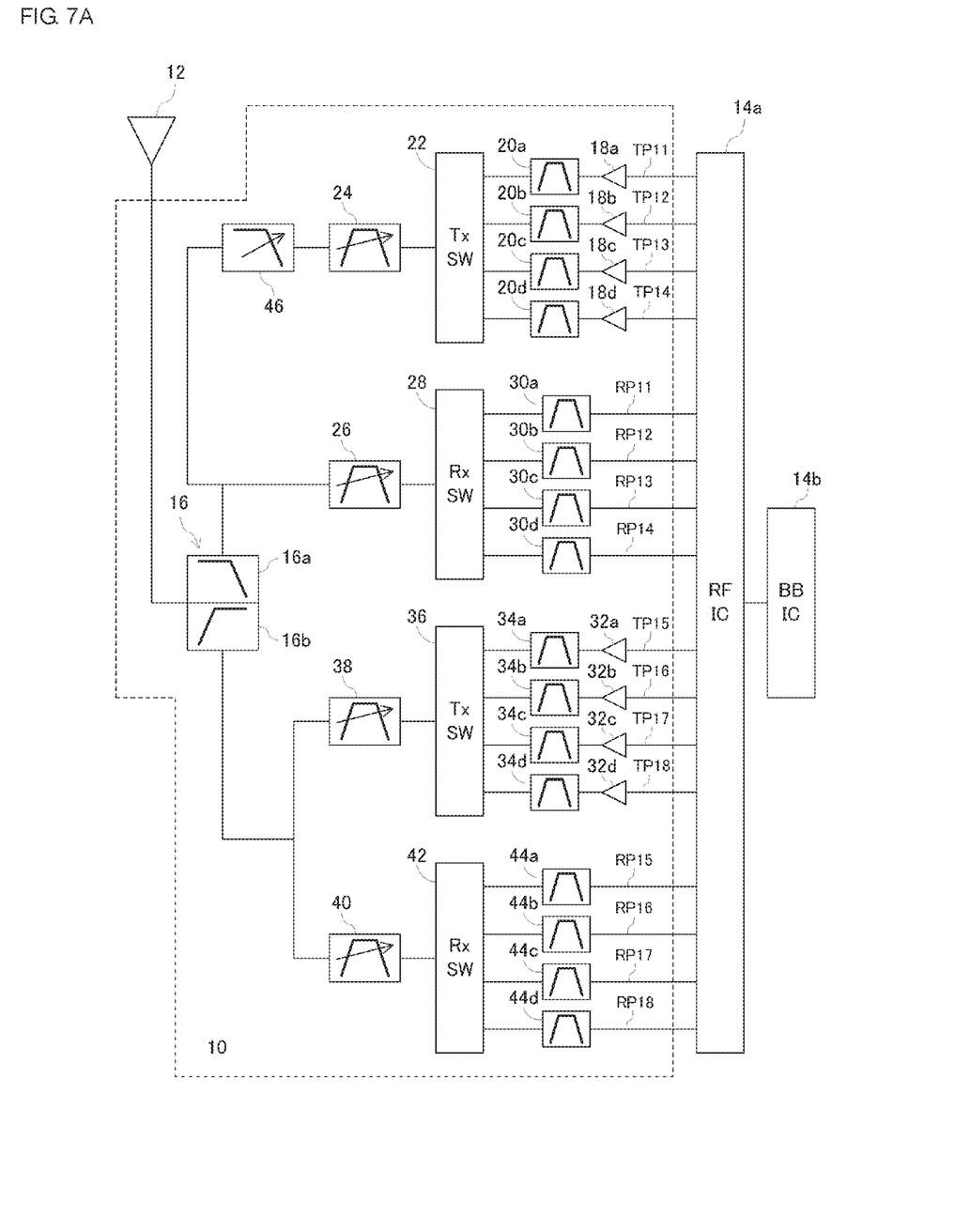
FIG. 7A is a block diagram illustrating a configuration of a communication apparatus according to another embodiment.
Figure 7B:
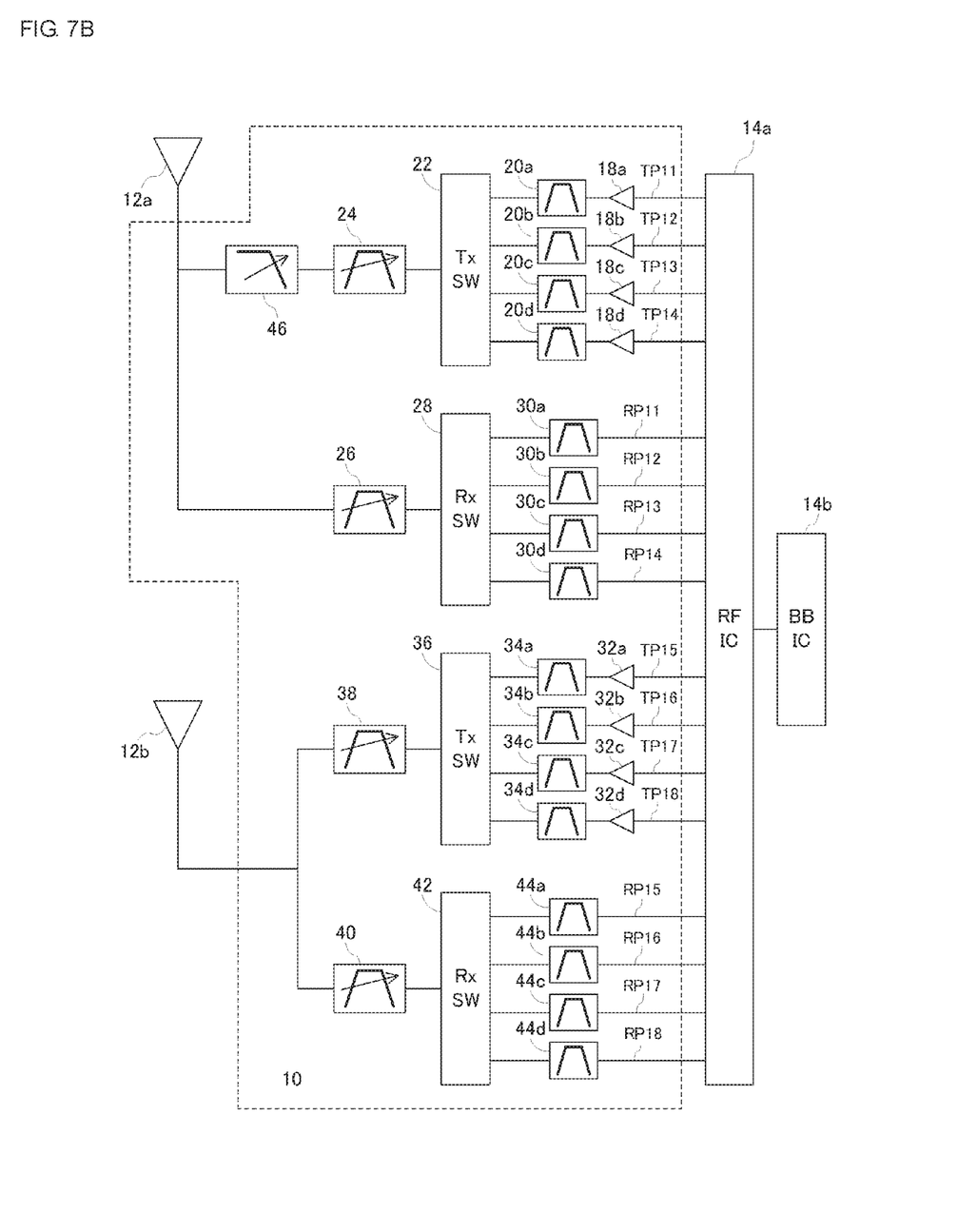
FIG. 7B is a block diagram illustrating a configuration of a communication apparatus according to another embodiment.

Depending on the combination of the desired first frequency band and the desired second frequency band, in the case where carrier aggregation is performed, the signal to noise ratio of a reception signal of the desired second frequency band is degraded by harmonic of a transmission signal of the desired first frequency band. Such a concern may be reduced by adding a variable LPF (harmonic variable filter) 46 for reducing harmonic of the transmission signal of the desired first frequency band in the previous stage of the tunable filter 24, as illustrated in FIG. 7A or 7B.

The variable LPF 46 may be added in the subsequent stage of the tunable filter 24. The tunable filter 24 is optional for suppressing reception band noise of a transmission wave, whereas the variable LPF 46 is to be added according to need. Therefore, any one of providing both the tunable filter 24 and the variable LPF 46 and providing only the tunable filter 24 should be performed.

Figure 8:
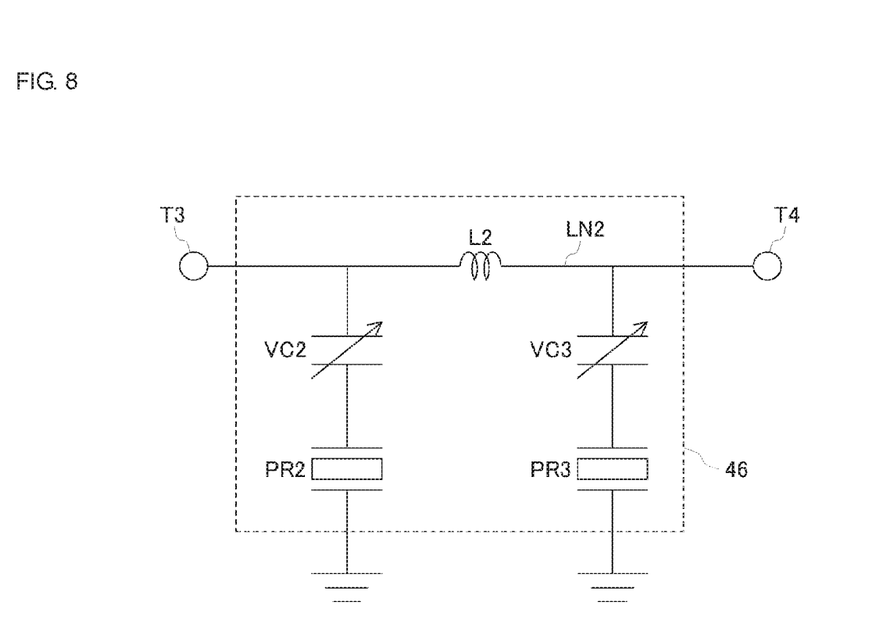
FIG. 8 is a circuit diagram illustrating an example of a configuration of a variable LPF.

The thus added variable LPF 46 is configured as illustrated in FIG. 8. Referring to FIG. 8, an inductor L2 is provided at the signal line LN2. One terminal of a variable capacitor VC2 is connected to the signal line LN2 on a side of one terminal of the inductor L2, and the other terminal of the variable capacitor VC2 is connected to a reference potential plane with a piezoelectric resonator PR2 interposed therebetween. One terminal of a variable capacitor VC3 is connected to the signal line LN2 on a side of the other terminal of the inductor L2, and the other terminal of the variable capacitor VC3 is connected to a reference potential plane with a piezoelectric resonator PR3 interposed therebetween.

Figure 9:
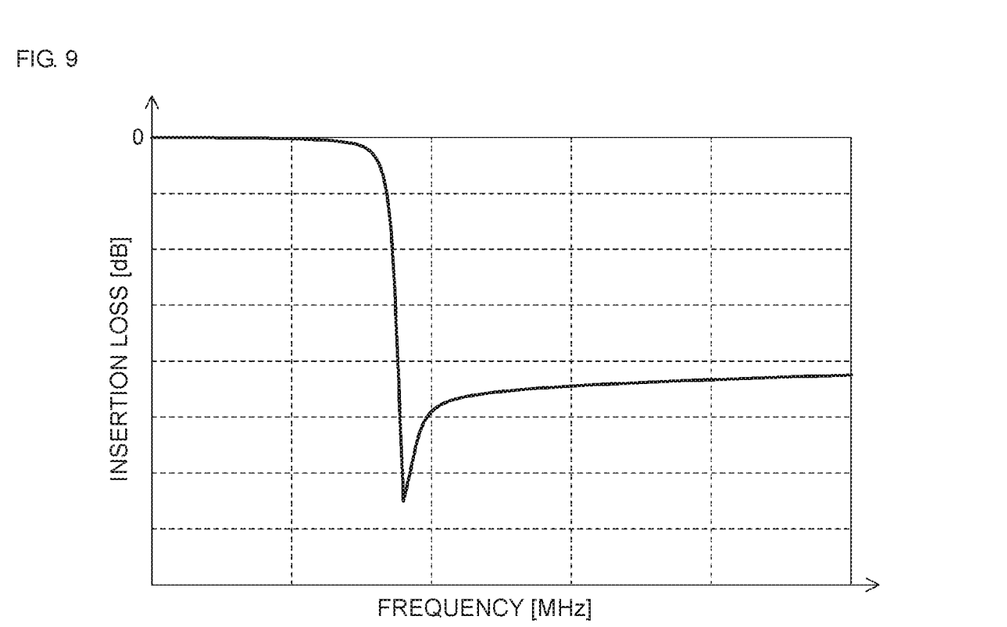
FIG. 9 is a graph illustrating an example of frequency characteristics of the variable LPF illustrated in FIG. 8.

The frequency characteristics of the variable LPF 46 configured as described above are illustrated in FIG. 9. As is clear from FIG. 9, insertion loss drastically increases in one direction in the vicinity of an attenuation pole, that is, in a stop band. Furthermore, the insertion loss is substantially zero in a region lower than the attenuation pole, and a specific attenuation is obtained in a region higher than the attenuation pole. The frequency of the attenuation pole depends on the capacitances of the variable capacitors VC2 and VC3. Each of the capacitances is adjusted according to the frequency of a transmission signal of a desired first frequency band.

In the case where the variable LPF 46 is provided in the previous stage of the tunable filter 24, a terminal T3 is connected to the LPF 16a of the diplexer 16, and a terminal T4 is connected to the tunable filter 24. In contrast, in the case where the variable LPF 46 is provided in the subsequent stage of the tunable filter 24, the terminal T3 is connected to the tunable filter 24, and the terminal T4 is connected to the Tx switch 22.

Figure 10:
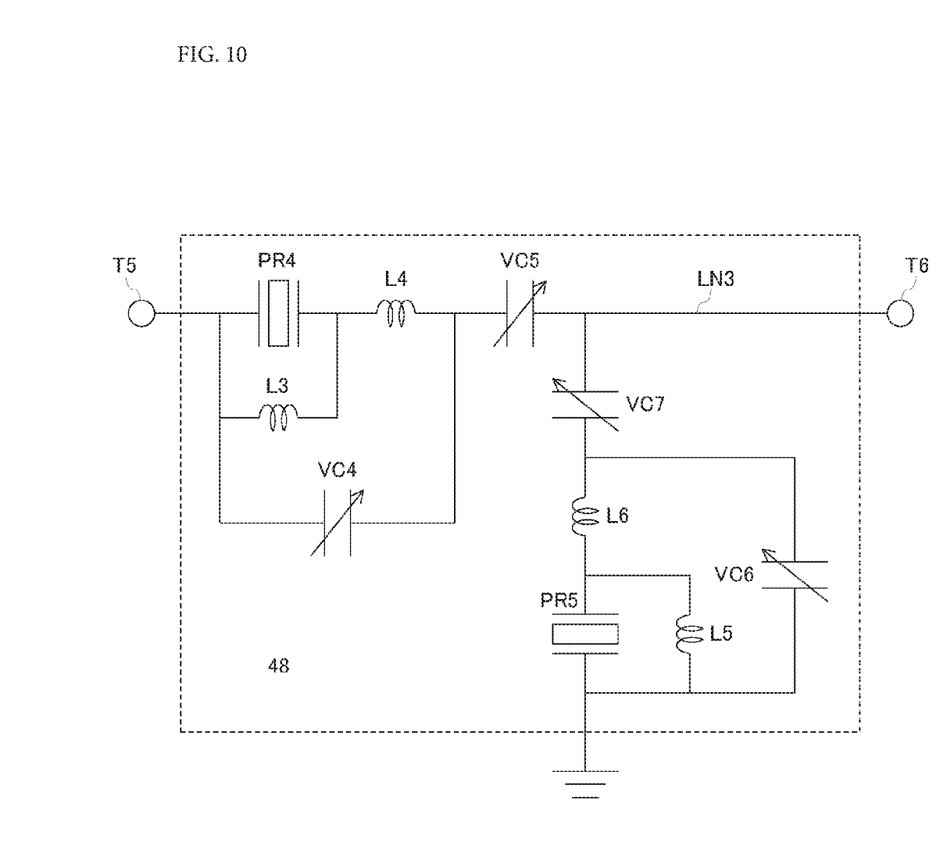
FIG. 10 is a circuit diagram illustrating an example of a configuration of a variable BPF which is provided instead of a tunable filter.

The tunable filter 24 and the variable LPF 46 which is provided in the previous or subsequent stage of the tunable filter 24 may be replaced by a variable BPF (transmission variable filter) 48 which is configured as illustrated in FIG. 10 such that the pass band of the variable BPF 48 is set to the transmission band of a desired first frequency band.

Furthermore, in accordance with a frequency of a transmission signal to be used, a filter for which frequency is not variable may be used in place of the variable LPF 46.

Referring to FIG. 10, a piezoelectric resonator PR4, an inductor L4, and a variable capacitor VC5 are provided in series at a signal line LN3. Specifically, one terminal of the piezoelectric resonator PR4 is connected to a terminal T5, and the other terminal of the piezoelectric resonator PR4 is connected to one terminal of the inductor L4. Furthermore, the other terminal of the inductor L4 is connected to one terminal of the variable capacitor VC5, and the other terminal of the variable capacitor VC5 is connected to a terminal T6. The terminal T5 is connected to the LPF 16a of the diplexer 16, and a terminal T6 is connected to the Tx switch 22.

One terminal and the other terminal of the inductor L3 are connected to one terminal and the other terminal of the piezoelectric resonator PR4, respectively, and one terminal and the other terminal of a variable capacitor VC4 are connected to one terminal of the piezoelectric resonator PR4 and the other terminal of the inductor L4, respectively.

One terminal of a variable capacitor VC7 is connected to the other terminal of the variable capacitor VC5, and the other terminal of the variable capacitor VC7 is connected to one terminal of an inductor L6. The other terminal of the inductor L6 is connected to one terminal of a piezoelectric resonator PR5, and the other terminal of the piezoelectric resonator PR5 is connected to a reference potential plane. One terminal and the other terminal of the inductor L5 are connected to one terminal and the other terminal of the piezoelectric resonator PR5, respectively, and one terminal and the other terminal of a variable capacitor VC6 are connected to one terminal of the inductor L6 and the other terminal of the piezoelectric resonator PR5, respectively.

Figure 11:
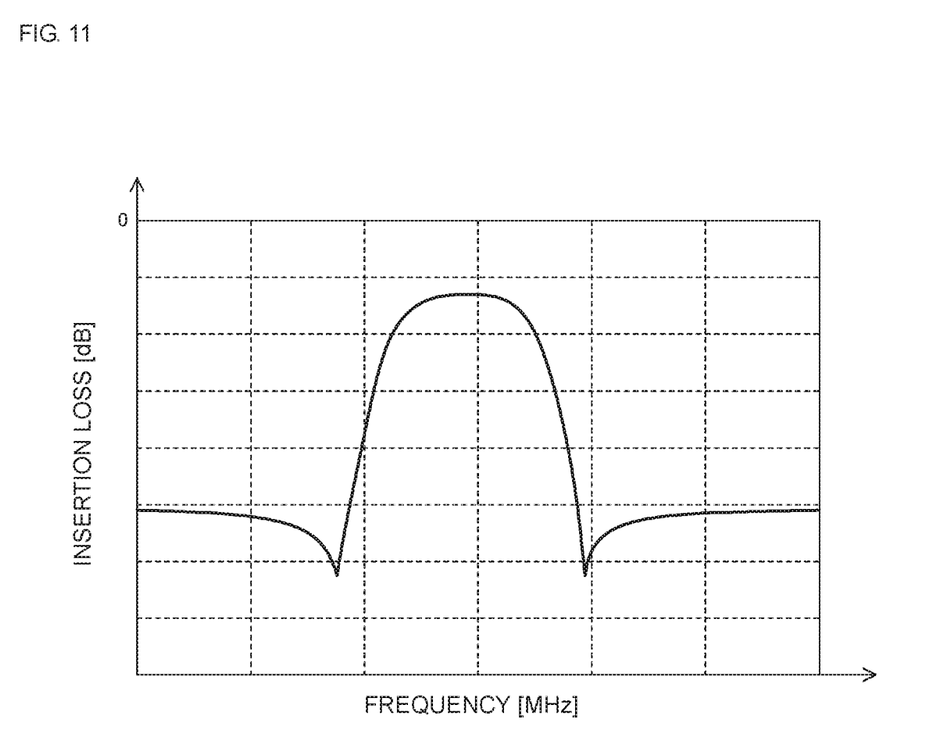
FIG. 11 is a circuit diagram illustrating an example of frequency characteristics of the variable BPF illustrated in FIG. 10.

The frequency characteristics of the variable BPF 48 configured as described above are illustrated in FIG. 11. Referring to FIG. 11, two attenuation poles appear. Insertion loss exhibits a value near 0 dB in a region sandwiched between the two attenuation poles. Furthermore, the insertion loss exhibits values substantially near 0 dB in a region lower than a lower attenuation pole and a region higher than a higher attenuation pole, compared to values at the attenuation poles. Therefore, the region sandwiched between the two attenuation poles is defined as a pass band, and the region lower than the pass band and the region higher than the pass band are defined as stop bands.

The frequency and insertion loss of the attenuation poles depend on the capacitances of the variable capacitors VC4 to VC7. Each of the capacitances is adjusted such that a pass band and the transmission band of a desired first frequency band overlap, any one of the attenuation poles and the reception band of the desired first frequency band overlap, and a desired attenuation may be achieved in the stop bands.

REFERENCE SIGNS LIST

1 . . . transmission and reception module
TP01 to TP04 . . . transmission path
RP01 to RP04 . . . reception path
6 . . . Tx switch (transmission switch)
7 . . . tunable filter (transmission variable filter)
8 . . . Rx switch (reception switch)
10 . . . transmission and reception module
TP11 to TP14 . . . first transmission path
RP11 to RP14 . . . first reception path
TP15 to TP18 . . . second transmission path
RP15 to RP18 . . . second reception path
14a . . . RFIC (high-frequency integrated circuit)
14b . . . BBIC (baseband integrated circuit)
16 . . . diplexer
16a . . . LPF (first filter element)
16b . . . HPF (second filter element)
18a to 18d . . . power amplifier
22 . . . Tx switch (first transmission switch)
24 . . . tunable filter (transmission variable filter)
26 . . . tunable filter (reception variable filter)
28 . . . Rx switch (first reception switch)
36 . . . Tx switch (second transmission switch)
42 . . . Rx switch (second reception switch)
46 . . . variable LPF (harmonic variable filter)
48 . . . variable BPF (transmission variable filter)
VC1 . . . variable capacitor
PR1 . . . piezoelectric resonator
L1 . . . inductor
SW1 . . . switch (filter switch)

The invention claimed is:

1. A transmission and reception module comprising:
a plurality of first transmission paths that correspond to a plurality of first different frequency bands, a plurality of first transmission signals being transmitted through the plurality of first transmission paths to an antenna;
a plurality of first reception paths that correspond to the plurality of first frequency bands, a plurality of first reception signals received from the antenna being transmitted through the plurality of first reception paths;
a first transmission switch that selects a first transmission path from among the plurality of first transmission paths to be electrically connected to the antenna;

a first reception switch that selects a first reception path from among the plurality of first reception paths to be electrically connected to the antenna;

a diplexer comprising a first filter through which the plurality of first frequency bands pass and a second filter through which a plurality of second different frequency bands pass, the diplexer being connected to the antenna;

a harmonic variable filter provided between the diplexer and the first transmission switch, the harmonic variable filter being configured to vary a pass band to attenuate harmonics in individual frequency bands of the plurality of first frequency bands; and a transmission variable filter provided between the antenna and the first transmission switch, wherein a pass band of the transmission variable filter is configured to vary to attenuate reception band noise in the plurality of first frequency bands.

2. The transmission and reception module according to claim 1, further comprising:

a reception variable filter provided between the antenna and the first reception switch, the reception variable filter being configured to attenuate transmission band noise in the plurality of first frequency bands.

3. The transmission and reception module according to claim 1, further comprising:

a plurality of second transmission paths that correspond to the plurality of second frequency bands, a plurality of second transmission signals being transmitted through the plurality of second transmission paths to the antenna;

a plurality of second reception paths that correspond to the plurality of second frequency bands, a plurality of second reception signals being transmitted through the plurality of second reception paths;

a second transmission switch that selects a second transmission path from among the plurality of second transmission paths to be electrically connected to the antenna; and a second reception switch that selects a second reception path from among the plurality of second reception paths to be electrically connected to the antenna.

4. The transmission and reception module according to claim 1, wherein the harmonic variable filter comprises an inductor in a transmission line and two arms respectively connected between each terminal of the inductor and a reference potential node, and wherein each arm comprises a variable capacitor and piezoelectric resonator connected in series.

5. The transmission and reception module according to claim 1, wherein the transmission variable filter comprises:

a variable capacitor configured to be adjusted to a capacitance corresponding to one of the plurality of first frequency bands, a first terminal of the variable capacitor being connected to a transmission line, a piezoelectric resonator provided between a second terminal of the variable capacitor and a reference potential node, and an inductor connected in parallel with the piezoelectric resonator.

6. The transmission and reception module according to claim 1, further comprising:

a filter switch that turns on the transmission variable filter by electrically connecting the transmission variable filter to a transmission line.

7. The transmission and reception module according to claim 1, further comprising:

a filter switch that turns off the transmission variable filter by electrically shorting a transmission line around the transmission variable filter.

8. The transmission and reception module according to claim 1, further comprising:

a plurality of power amplifiers each provided in a respective one of the plurality of first transmission paths, the plurality of power amplifiers being configured to amplify the plurality of first transmission signals.

9. A communication apparatus comprising:

the transmission and reception module according to claim 1; and a harmonic integrated circuit connected to the transmission and reception module.

10. The communication apparatus according to claim 9, further comprising:

a baseband integrated circuit connected to the harmonic integrated circuit.

* * * * *